3,057,881
SUBSTITUTED 3,3,3-TRIPHENYL-PROPYLAMINES
    AND PROCESS FOR PREPARING THEM
Heinrich Ruschig, Bad Soden (Taunus), and Manfred
  Schorr, Rudolf Fussganger, Fritz Bauer, and Georg
  Nesemann, Frankfurt am Main, Germany, assignors to
  Farbwerke Hoechst Aktiengesellschaft vormals Meister
  Lucius & Brüning, Frankfurt am Main, Germany, a
  corporation of Germany
  No Drawing. Filed Dec. 8, 1959, Ser. No. 858,074
      Claims priority, application Germany Dec. 11, 1958
             7 Claims. (Cl. 260—389)

The present invention relates to new substituted 3,3,3-triphenyl-propylamines of the general formula

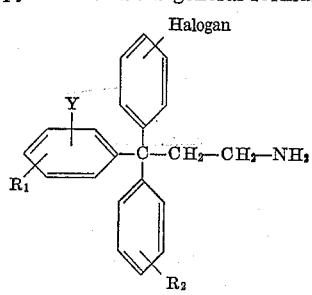

in which $R_1$ and $R_2$ are hydrogen or halogen atoms, Y is hydrogen or chlorine, and their salts.

While being well tolerated the new compounds possess in particular valuable bactericidal and bacteriostatic properties and are, furthermore, appropriate as intermediate products for the production of medicaments.

The present invention likewise relates to the preparation of the 3,3,3-triphenyl-propylamines of the general formula

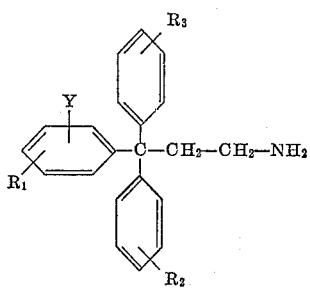

in which $R_1$, $R_2$ and $R_3$ are hydrogen or halogen atoms, Y is hydrogen or chlorine, and their salts which are obtained by heating under reflux a triphenyl carbinol of the general formula

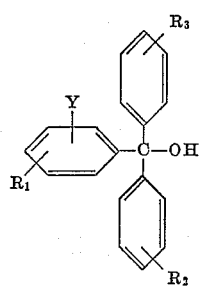

in which $R_1$, $R_2$ and $R_3$ have the meanings given above, in the presence of an aliphatic carboxylic acid of low molecular weight and a salt of a metal of the second subgroup of the periodic system with an inorganic acid or an aliphatic carboxylic acid of low molecular weight, reducing to the amino group the cyanogen group in the $\beta,\beta,\beta$-triphenyl-propionitrile obtained which corresponds to the general formula $$\text{[structure]}$$

in which $R_1$, $R_2$ and $R_3$, and Y have the meanings given above, according to methods that are generally used in order to convert nitriles into amines, and, if necessary, converting the bases obtained into the corresponding salts by treatment with inorganic or organic acids.

As radicals $R_1$, $R_2$ and $R_3$ in the compounds there enter into consideration hydrogen atoms or halogen atoms such as fluorine, chlorine, bromine or iodine, fluorine and chlorine being especially suitable.

It is already known that $\beta,\beta,\beta$-triphenyl-propionitrile is obtained from $\beta,\beta,\beta$ - triphenyl - pronionic acid by converting the latter into its acid cholride, converting this compound into the corresponding acid amide and finally dehydrating the latter to the nitrile (cf. E. Bergmann et al., Ber. dtsch. Chem. Ges. 63 (1930), page 1176; L. Hellerman et al., J. Am. Chem. Soc. 68 (1946), page 819). The $\beta,\beta,\beta$-triphenyl-propionic acid can be obtained in yields of 50–60% by reacting triphenyl carbinol with malonic acid (cf. E. Bergmann et al., Liebigs Ann. Chem. 480 (1930), page 57).

Furthermore, the preparation of $\beta,\beta,\beta$-triphenyl-propionitrile by directly melting together triphenylcarbinol and cyano-acetic acid was already disclosed (cf. R. Fosse, Compt. rend., Acad. Sciences 145 (1907), page 196, and E. Bergmann et al., Ber. dtsch. Chem. Ges. 63 (1930), page 1176). The nitrile is thereby formed in a yield slightly inferior to 30% in addition to a highly melting substance designated as triphenylmethylimine-ketene which must be separated off in a troublesome manner.

It is likewise known that $\beta,\beta,\beta$-triphenyl-propionitrile can be converted into the 3,3,3-triphenyl-propylamine by treatment with sodium in boiling alcohol (cf. L. Hellerman and R. L. Garner, J. Am. Chem. Soc. 68 (1946), page 819). With halogen-substituted triphenyl-propionitriles forming the subject matter of the present invention this method cannot be applied since the compounds are not enough soluble in alcohol. Also the $\beta,\beta,\beta$-triphenyl-propionaldehyde-oxime can be reduced by means of sodium in alcohol in order to obtain the 3,3,3-triphenyl-propylamine, but the first mentioned substance is only difficultly accessible according to L. Hellerman and R. L. Garner.

The triphenyl-carbinols used as starting substances for the process of the present invention can be prepared according to various known methods, for instance according to the process disclosed in German Patent 1,036,242, by allowing halogen-benzotrihalides to act on excessive halogen-benzenes in the presence of aluminum chloride or iron chloride. The following compounds may, for example, be used: triphenyl-carbinol, diphenyl-4-chlorophenyl-carbinol, phenyl-di-(4-chlorophenyl)-carbinol, tri-(4-chlorophenyl)-carbinol, 3-chlorophenyl-di-(4-chlorophenyl) - carbinol, 2-chlorophenyl-di-(4-chlorophenyl)-carbinol, 3-fluorophenyl-di-(4-chlorophenyl)-carbinol, di-(4-fluorophenyl)-4-chlorophenyl-carbinol, 4-fluorophenyl-4 - chlorophenyl - 3-chlorophenyl-carbinol, 3,4-dichlorophenyl-di-(4-chlorophenyl)-carbinol and 2,4-dichlorophenyl-di-(4-chlorophenyl)-carbinol.

The first stage of the process according to the present invention is carried out by reacting a triphenyl-carbinol with cyanoacetic acid in the presence of a solvent or a diluent and a condensing agent. A favorable method of preparation consists in pouring a sufficient amount of a solvent or diluent over triphenyl-carbinol and cyanoacetic acid in a molar ratio of, for instance, 1:2, adding at least 0.5 molecular proportion of a condensing agent consisting of a salt of a metal of the second sub-group of the periodic system of Mendelejeff with an inorganic or a low molecular weight carboxylic acid, and heating the mixture suitably while mechanically stirring under reflux to boiling. It is favorable to operate at at temperature between 80 and 180° C. and to choose the boiling temperature of the solvent or the diluent used in each individual case. As solvents can be used low molecular aliphatic carboxylic acids such as acetic acid, propionic acid or butyric acid, particularly acetic acid.

As condensing agents can be used, for instance, zinc, cadmium or mercury salts of inorganic acids or of low molecular weight aliphatic carboxylic acids. There are mentioned, for example: hydrohalic acids such as hydrochloric and hydrobromic acid, hydrocyanic acid, sulfuric acid, acetic acid, propionic acid and the like. It is of advantage to use salts which are at least partially soluble in the compounds named as solvents. The $\beta,\beta,\beta$-triphenyl-propionitriles obtained in the reaction generally separate off upon cooling of the reaction mixture in a pure and solid form and can be isolated by filtering them off with suction. Compounds whose benzene nuclei are unequally substituted generally show only a slight tendency for crystallization. In these cases it is of advantage to pour the reaction mixture into water and to take up the precipitated product in an organic solvent immiscible with water, for example diethylether, chloroform or benzene and to isolate the nitrile after washing and drying of the solution and distilling off of the solvent.

In most cases the $\beta,\beta,\beta$-triphenyl-propionitriles thus obtained are viscous oils or colorless crystalline substances. In contradistinction to the direct reaction of triphenyl-carbinol with cyanoacetic acid (cf. E. Bergmann et al., Ber. dtsch. Chem. Ges. 63 (1930), page 1176) already mentioned as state of the art which is known to occur with formation of a highly melting substance designated as triphenylmethylimine-ketene, the $\beta,\beta,\beta$-triphenyl-propionitriles are obtained according to the process of the invention in a simple manner and in an amount of 85-95% of the theoretical yield, no by-products being formed. This fact is of importance in as far as with the addition of a condensing agent alone, such as zinc chloride, to the melt consisting of triphenylmethyl carbinol and cyanoacetic acid no triphenylmethylimine-ketene is formed, but the corresponding nitrile is obtained in bad yields and in contaminated state only. On the other hand, when the reactants are heated in glacial acetic acid without addition of a condensing agent, no nitrile is obtained at all, but only the highly melting substance is isolated in an unsatisfying yield.

In the second reaction stage according to the invention the cyanogen group in the $\beta,\beta,\beta$-triphenyl-propionitriles obtained is reduced according to methods which are generally applied for the conversion of nitriles into amines. An advantageous method of operation consists in reducing the cyanogen group by catalytic hydrogenation, it being advisable to operate in the presence of excessive ammonia in order to avoid the formation of secondary amines. Nickel or cobalt, preferably Raney Nickel, are suitable as catalysts. The catalysts can likewise be activated by small additions of precious metals such as platinum or palladium.

The reduction is suitably carried out in the presence of a diluent, aliphatic alcohols of low molecular weight such as methanol, ethanol or cyclic ethers, for instance tetrahydrofurane or dioxane, entering into consideration. Dioxane is most suitable since the nitriles are, in general, well soluble in dioxane. It is of advantage to carry out the reaction at a hydrogen pressure of 50–150 atmospheres' gauge pressure, preferably 60–130 atmospheres, and at a moderately elevated temperature, for instance at 60–80° C. The indicated temperature range does not represent an absolute limit, but it is of advantage to maintain the temperature below 80° C., since otherwise a distinct amount of halogen is split off. On the other hand, hydrogenation at a temperature below 60° C. proceeds only very slowly.

Other suitable methods for the reduction of the substituted $\beta,\beta,\beta$-triphenyl-propionitriles consist, for instance, in treating the compounds with appropriate metal hydrides such as lithium-aluminum hydride or sodium boronhydride. A favorable method of realizing the process consists in dropwise adding a solution of the nitrile in appropriate solvents and while cooling to a suspension of the metal hydride and achieving the reaction at room temperature or at a moderately elevated temperature upon termination of the addition. As solvents there enter into consideration, for example, cyclic ethers such as dioxane or tetrahydrofurane, the latter being most advantageous. In order to work up and separate off unreacted metal hydride, low amounts of water and sodium hydroxide solution are added to the reaction mixture so that the decomposition products are separated off in a solid state. After filtering off with suction the reaction product dissolved in the organic phase can be isolated and purified in the usual manner.

The products of the invention generally are highly viscous, non-distillable oils which crystallize only in a few cases. By treating them with inorganic or organic acids the free bases can be converted into the corresponding acid addition salts. In most cases the latter are colorless crystalline compounds which are more or less soluble in water depending on the type and number of the substituents contained in the benzene nucleus. As inorganic acids there enter into consideration, for instance, hydrohalic acids such as hydrochloric acid, hydrobromic acid or sulfuric acid, phosphoric acid, amidosulfonic acid. As organic acids there may be used, for instance, acetic acid, propionic acid, butyric acid, aceturic acid, stearic acid, oxalic acid, tartaric acid, malic acid, maleic acid, fumaric acid, citric acid, aspartic acid, p-amidobenzoic acid, salicylic acid or ethylene-diaminotetracetic acid.

The new products possess valuable therapeutic properties, above all bacteriostatic and bactericidal activity. The compounds are active on a great number of gram-positive and gram-negative germs to a concentration limit of about 1–2 $\gamma$/ml.

The following table shows a comparison of the toxicities and the limits of bactericidal and bacteriostatic action of two compounds obtained according to the invention ($a$ and $b$) and the corresponding values shown by the known compound 3,3,3-triphenyl-propylamine ($c$).

TABLE

| | Toxicity (maximum tolerated dose) in mice (in mg./20 g.) | | |
|---|---|---|---|
| | a | b | c |
| Subcutaneously | 25 | 10.4 | 6.25 |
| Orally | 15 | 15.6 | 6.25 |

| | Lowest effective concentration causing bactericidal activity in γ/ml. | | | | | |
|---|---|---|---|---|---|---|
| | after 5 min. | after 15 min. | after 5 min. | after 15 min. | after 5 min. | after 15 min. |
| Germs: | | | | | | |
| Staphylococcus aureus | 12.5 | 12.5 | 15.6 | 15.6 | 250 | 125 |
| E. coli | 12.5 | 12.5 | 31.5 | | 125 | 125 |
| Bacterium typhi | 12.5 | 12.5 | 15.6 | 15.6 | 125 | 125 |

| | Lowest effective concentration causing bacteriostatic activity in γ/ml. | | |
|---|---|---|---|
| Streptococcus haemolyticus | 1.6 | 1.6 | 7.8 |
| Corynebacterium diphtheriae | 12.5 | 4.0 | 15.6 |
| Staphylococcus aureus | 0.8 | 1.6 | 31.5 |
| E. coli | 12.5 | 16.0 | 62.5 |
| Pseudomonas aeruginosa | 10.0 | 32.0 | 250.0 | a=3,3,3-tri-(4-chlorophenyl)-propylamino-hydrochloride.
b=3 - (3 - fluorophenyl) - 3,3 - bis - (4 - chlorophenyl) - propylamino-hydrochloride.
c=3,3,3-triphenyl-propylamino-hydrochloride.

The test results of the table are self-explanatory and show that the new products obtained by the process of the invention as regards bacteriostatic as well as bactericidal action are distinctly superior to the known 3,3,3-triphenyl-propylamino-hydrochloride. The same applies as regards tolerability.

In addition to the extraordinary activity on gram-positive and gram-negative germs the products obtained according to the process of the invention show a fungistatic and a fungicidal activity. For example, the lowest concentration causing fungistatic activity of the compounds (a) and (b) obtained according to the process of the invention on pathogenic yeasts such as *Candida albicans* amounts to about 8 γ/ml. The corresponding concentration limits of the products of the invention (a) and (b) as regards fungistatic activity on apathogenic molds such as *Penicillium glaucum* amout to 15–16 γ/ml. and are, thus, within the same range.

The fungistatic activity of the compounds was determined by a method similar to that described in "Archiv für Dermatologie und Syphilis," volume 188 (1949, page 259, by Schraufstätter, Richter and Dittscheid, by carrying out tests at a series of dilutions and determining the lowest effective concentration at 28° C. after an incubation period of 18 days.

The bacteriostatic activity was determined by the known method developed by Wright (The Lancet (1912)), by carrying out tests at a series of dilutions, depending on the type of the test organisms used either in bouillon or in serum-bouillon as nutrient solution, with a small inoculation. The results were determined after an incubation of 18 to 20 hours at 28° C. at the junction between clear and turbid test solution.

The bactericidal activity of the compounds has been determined by the Rideal-Walker test by inoculating the test medium consisting of glucose/bouillon after 5 minutes and after 15 minutes.

The action of the compounds of the invention is preponderantly bactericidal, so that they may be used as disinfectants and/or preserving agents.

The compounds of the invention are likewise valuable intermediate products for the manufacture of medicaments.

The compounds may be used as such or as galenical preparations thereof, for example, gelées, powders, ointments, pastes, mixtures that require shaking, tinctures, solutions or suspensions in admixture or conjunction with the usual physiologically tolerable, pharmaceutically usual, organic or inorganic carriers provided that these do not react with the compounds of the invention. As carriers there may be considered, for example, water, gelatine, bolus, lactose, starch, magnesium stearate, talcum, vegetable oils, benzyl alcohol, gum, polyethyleneglycol, cholesterine, white petroleum jelly, zinc oxide, titanium dioxide and the like. The products of the invention or the corresponding galencial preparations thereof may be sterilized and/or they may contain assistants, such as stabilizers, buffers, wetting agents, emulsifiers or salts which vary the osmotic pressure. The galenicals may be prepared by the usual methods.

The active compounds may be present in the galenical preparation for example, in a proportion within the range of 0.1 to 5%. When the products of the invention are applied in the form of gelées, a medium does of 0.5% has proved to be advantageous.

The following examples serve to illustrate the invention but they are not intended to limit it thereto.

EXAMPLE 1

(a) β,β,β-Tri-(4-Chlorophenyl)-Propionitrile

A mixture of 728 grams of tri-(4-chlorophenyl)-carbinol, 340 grams of cyanoacetic acid, 720 grams of glacial acetic acid and 136.5 grams of anhydrous zinc chloride is heated for three hours under reflux and while mechanically stirred, the bath temperature amounting to 140–150° C. A yellow clear solution is formed. Upon cooling crystals separate off which are filtered off with suction, washed with methanol and dried at 100° C. 678 grams of β,β,β-tri-(4-chlorophenyl)-propionitrile are obtained in the form of a yellowish crystalline powder which melts at 170–172° C. Upon recrystallization from isopropanol the melting point remains constant.

(b) 3,3,3-Tri-(4-Chlorophenyl)-Propylamine 400 grams of β,β,β-tri-(4-chlorophenyl)-propionitrile are dissolved in 5400 cc. of dioxane which had been saturated in the cold with gaseous ammonia (15–20 grams of ammonia per 1000 cc. of dioxane). Upon addition of about 30 grams of Raney nickel the mixture is hydrogenated under a pressure of 100–120 atmospheres (gauge) at a temperature of 60–65° C. After the calculated amount of hydrogen has been consumed the catalyst is filtered off with suction and the solvent is completely evaporated. The remaining crude amine is dissolved in 500 cc. of methanol, alcoholic hydrochloric acid is added until distinctly acid reaction takes place, and the mixture is then again evaporated to dryness. The residue is dissolved in 500 cc. of acetone, upon addition of a small amount of animal char coal filtered, and 2500 cc. of diisopropylether are added. The precipitation of the hydrochloride in the form of fine, felted needles sets in immediately. Upon standing for several hours it is filtered off with suction, washed with diisopropylether and dried at 100° C. 392 grams of 3,3,3-tri-(4-chlorophenyl)-propylamine-hydrochloride are obtained which can be further purified by a second recrystallization in acetone/diisopropylether. The pure 3,3,3-tri-(4-chlorophenyl)-propylamine is obtained from the salt by shaking with dilute sodium hydroxide solution and ether until complete dissolution, drying of the ether solution and distilling off of the ether are attained. A light-yellow, highly viscous oil is formed.

The hydrochloride contains ½ molecular proportion of crystal water. Its melting point amounts to 248–250° C. It is sparingly soluble in cold water, easily soluble in boiling water. On cooling of the hot concentrated solution a gel is formed.

The oxalate forms colorless crystals decomposing at 168–171° C.

The crude amine can likewise be purified in the following manner: The oil remaining after separating off the Raney-nickel and the dioxane is dissolved in a little alcohol, the solution is acidified to a high degree with an excess amount of alcoholic hydrochloric acid solution and much water is added. When the precipitated hydrochloride has become solid, it is filtered off with suction and further purified upon drying, in the manner described above. Furthermore, the crude amine can be dissolved in diisopropylether, by introducing hydrogen chloride the hydrochloride can be precipitated off and the hydrochloride can be further purified as described above.

EXAMPLE 2

*β,β,β-Tri-(4-Chlorophenyl)-Propionitrile*

36.4 grams of tri-(4-chlorophenyl)-carbinol, 17 grams of cyanoacetic acid, 36 grams of propionic acid and 13.6 grams of anhydrous zinc chloride are heated for two hours under reflux. On cooling the β,β,β-tri-(4-chlorophenyl)-propionitrile crystalizes out. It is filtered off with suction, washed with methanol, dried at about 100° C. and 32 grams of a yellowish product are obtained melting at 169–172° C.

The reduction is carried out as described in Example 1b.

EXAMPLE 3

*β,β,β-Tri-(4-Chlorophenyl)-Propionitrile*

36.4 grams of tri-(4-chlorophenyl)-carbinol, 17 grams of cyanoacetic acid, 36 grams of glacial acetic acid and 11.5 grams of zinc bromide are heated for two hours to boiling at the reflux cooler. On cooling crystals precipitate from the clear solution, they are filtered off with suction and washed with methanol. 35 grams of β,β,β-tri-(4-chlorophenyl)-propionitrile melting at 169–172° C. are obtained.

The reduction is carried out as described in Example 1b.

EXAMPLE 4

*β,β,β-Tri-(4-Chlorophenyl)-Propionitrile*

36.5 grams of tri-(4-Chlorophenyl)-carbinol, 17 grams of cyanoacetic acid, 36 grams of glacial acetic acid and 27.1 grams of mercury-II-chloride are heated for two hours under reflux. On cooling, crystals precipitate off which are filtered off with suction and washed with methanol. 29 grams of β,β,β-tri-(4-chlorophenyl)-propionitrile still containing slight amounts of mercury are obtained. By recrystallization from isopropanol the substance can be purified. The melting point amounts to 168–171° C.

The reduction is carried out as described in Example 1b.

EXAMPLE 5

(a) *β,β,β-Triphenyl-Propionitrile*

A mixture of 130 grams of triphenyl-carbinol, 85 grams of cyanoacetic acid, 130 grams of glacial acetic acid and 34 grams of zinc chloride is heated to boiling for two to three hours under reflux. A clear solution is formed from which crystals are separated off on cooling. The mass is filtered off with suction, washed with methanol. 121 grams of β,β,β-triphenyl-propionitrile are obtained in the form of yellowish crystals melting at 137–139° C. By recrystallization from methanol the product can be further purified whereby colorless crystals are obtained which melt at 138–139° C.

(b) *3,3,3-Triphenyl-Propylamine*

110 grams of β,β,β-triphenyl-propionitrile are dissolved in 1700 cc. of dioxane saturated with ammonia and are hydrogenated with Raney nickel as catalyst at 100 atmospheres' gauge pressure at 70° C. When all hydrogen has been taken up, the Raney nickel is filtered off with suction and the solvent is evaporated. The remaining oil is dissolved in 1500 cc. of ether and an amount of alcoholic hydrogen chloride solution slightly exceeding the calculated amount is added. The salt which is at first obtained in the form of an oil soon solidifies and is then filtered off with suction and washed with ether. 112 grams of 3,3,3-triphenyl-propylamine-hydrochloride are obtained as a colorless crystalline powder. If necessary, it may be recrystallized from water.

The 3,3,3-triphenyl-propylamine is obtained from the salt by dissolution in hot water and adding concentrated ammonia solution to the solution. A colorless crystalline powder is obtained which melts at 90–93° C. and can be recrystallized from cyclohexane. The hydrochloride melts at 252–255° C.

EXAMPLE 6

(a) *β-Phenyl-β,β-Di-(4-Chlorophenyl)-Propionitrile*

164.5 grams of phenyl-di-(4-chlorophenyl)-carbinol, 85 grams of cyanoacetic acid, 165 grams of glacial acetic acid and 34 grams of anhydrous zinc chloride are heated, while stirring, for two to three hours under reflux. The clear solution is then poured into about 100 cc. of water and the separated product is taken up with ether. The ether is washed with water until showing a neutral reaction, dried over magnesium sulfate and finally completely concentrated, by creating, at the end, a vacuum. There remain behind 167 grams of β-phenyl-β,β-di-(4-chlorophenyl)-propionitrile in the form of a light-brown oil of high viscosity.

(b) *3-Phenyl-3,3-Di-(4-Chlorophenyl)-Propylamine*

167 grams of β-phenyl-β,β-di-(4-chlorophenyl)-propionitrile are dissolved in 1800 cc. of dioxane saturated with ammonia, and are hydrogenated after addition of Raney nickel at 100 atmospheres' gauge pressure at 60–65° C. When all hydrogen has been taken up, the catalyst is filtered off with suction and the solvent is distilled off. There remains behind the crude amine which is dissolved in 2000 cc. of diisopropylether and a solution of 82 grams of crystalline oxalic acid in 100 cc. of methanol is added. The oxalate is immediately precipitated in a crystalline form. Upon standing for several hours it is filtered off with suction, washed with diisopropylether and dried at about 100° C. 156 grams of colorless 3-phenyl-3,3-di-(4-chlorophenyl)-propylamine-oxalate are obtained.

In order to obtain the free amine the salt is shaken with ether and dilute sodium hydroxide solution, the organic phase is dried and finally concentrated. The 3-phenyl-3,3-di-(4-chlorophenyl)-propylamine forms a yellowish, highly viscous oil. Melting point of the oxalate: 220–225° C. (with decomposition), of the maleinate: 150–152° C. (with decomposition).

EXAMPLE 7

(a) *β-(3-Chlorophenyl)-β,β-Di-(4-Chlorophenyl)-Propionitrile*

A mixture of 648 grams of (3-chlorophenyl)-di-(4-chlorophenyl)-carbinol is heated while stirring, 302 grams of cyanoacetic acid, 600 grams of glacial acetic acid and 122 grams of zinc chloride are heated for two to three hours under reflux. The mass is then poured into 2000–3000 cc. of water and the precipitated product is taken up with ether. The organic layer is washed with water until showing a neutral reaction, dried over magnesium sulfate and the ether is then distilled off, at last under reduced pressure. There remain behind 649 grams of β-(3-chlorophenyl)-β,β-di-(4-chlorophenyl)-propionitrile in the form of a light-brown, highly viscous oil.

(b) 3-(3-Chlorophenyl)-3,3-Di-(4-Chlorophenyl) Propylamine 140 grams of β-(3-chlorophenyl)-β,β-di(4-chlorophenyl)-propionitrile are dissolved in 2000 cc. of dioxane saturated with ammonia and after addition of Raney nickel are hydrogenated at 100 atmospheres' gauge pressure at 60–65° C. The catalyst is then filtered off with suction and the solvent is distilled off. The remaining crude amine is purified over oxalate. For this purpose it is dissolved in 2000 cc. of diisopropylether and a solution of 50 grams of crystalline oxalic acid in 100 cc. of methanol is added. After filtering with suction and washing with diisopropylether 87 grams of colorless 3-(3 - chlorophenyl)-3,3-di-(4-chlorophenyl)-propylamine-oxalate are obtained.

By shaking with ether and dilute sodium hydroxide solution until complete dissolution is attained, drying and evaporating of the organic phase the 3-(3-chlorophenyl)-3,3-di-(4-chlorophenyl)-propylamine is obtained as a light-yellow, highly viscous oil. The oxalate melts at 196–198° C. (with decomposition); the melting point of the tartate amounts to 216–217° C. (with decomposition).

EXAMPLE 8

(a) β-(3-Fluorohpenyl)-β,β-Di-(4-Chlorophenyl) Propionitrile 400 grams of 3-fluorophenyl-di-(4-chlorophenyl)-carbinol, 195 grams of cyanoacetic acid, 400 grams of glacial acetic acid and 77 grams of zinc chloride are heated for two to three hours while stirring and under reflux. The mass is then poured into 2000-3000 cc. of water, taken up with ether and the ether is washed with water until showing a neutral reaction. After drying over magnesium sulfate the ether is completely distilled off and 405 grams of β - (3-fluorophenyl)-β,β-di-(4-chlorophenyl)-propionitrile are obtained in the form of a brown, highly viscous oil.

(b) 3-(3-Fluorophenyl)-3,3-Di-(4-Chlorophenyl) Propylamine 140 grams of β-(3-fluorophenyl)-β,β - di - (4 - chlorophenyl)-propionitrile are dissolved in 2000 cc. of dioxane saturated with ammonia and hydrogenated with Raney nickel as catalyst under 100 atmospheres' gauge pressure at 60-69° C. After having removed nickel and dioxane by filtering off with suction or distilling off, the crude amine is dissolved in 2000 cc. of diisopropylether and a solution of 38 grams of anhydrous oxalic acid in 100 cc. of methyl alcohol is added. The oxalate precipitates in solid form. The compound is isolated by filtering it off with suction, washing with diisopropylether and 103 grams of 3-(3-fluorophenyl)-3,3 - di - (4 - chlorophenyl)-propylamine-oxalate are obtained as a colorless powder.

The free 3-(3-fluorophenyl)-3,3-di-(4 - chlorophenyl)-propyl-amine is obtained in the form of a light-yellow, highly viscous oil when shaking the salt with ether and dilute sodium hydroxide solution, drying the ethereal layer over potassium carbonate and, finally, distilling off the solvent completely. The melting point of the oxalate amounts to 195–197° C. (with decomposition), that of the hydrochloride to 178–180° C.

We claim:
1. A member of the group consisting of substituted 3,3,3-triphenyl-propylamines of the general formula

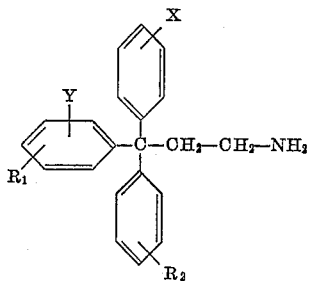

where $R_1$ and $R_2$ are members selected from the group consisting of hydrogen, fluorine and chlorine, X is a member of the group consisting of fluorine and chlorine and Y is a member of the group consisting of hydrogen and chlorine, and acid addition salts of these compounds.

2. The compound of the formula

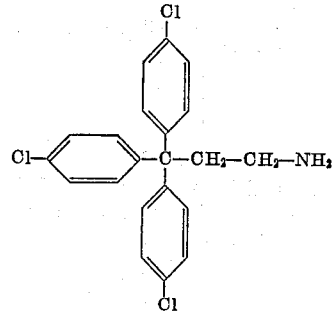

3. The compound of the formula

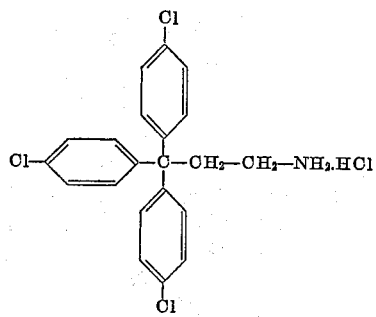

4. The compound of the formula

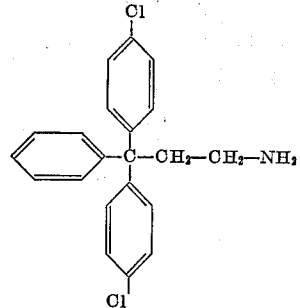

5. The compound of the formula

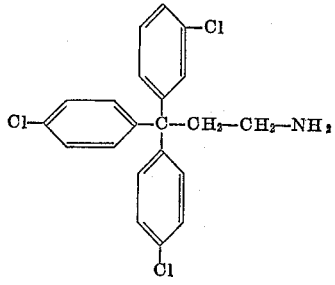

6. The compound of the formula

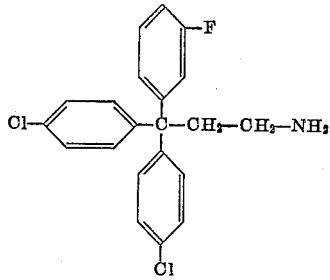

7. In the process of preparing 3,3,3-triphenyl-propyl-amines of the general formula

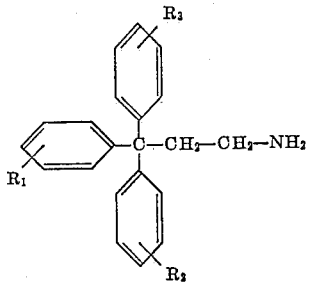

wherein $R_1$, $R_2$ and $R_3$ are members of the group consisting of hydrogen and halogen, by reacting a triphenyl-carbinol of the general formula

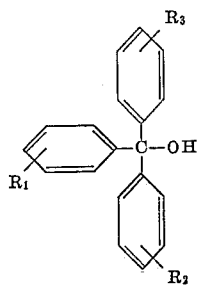

wherein $R_1$, $R_2$ and $R_3$ have the meanings given above, with cyano acetic acid, and reducing the cyano group in the compound obtained of the formula

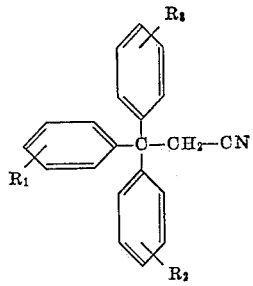

the step of refluxing at temperatures between 80 C. and 180° C. a triphenylcarbinol of the formula

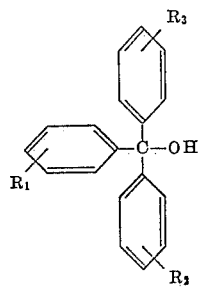

with an excess of at least two times the amount of cyano acetic acid in the presence of a low molecular weight aliphatic carboxylic acid as a diluent and a metal salt as a condensing agent containing a metal of the group consisting of cadmium, zinc and mercury, and a member selected from the group consisting of inorganic and low molecular weight aliphatic carboxylic acids.

References Cited in the file of this patent
UNITED STATES PATENTS
2,938,830    Davey et al. _____ May 31, 1960

OTHER REFERENCES

Horsefall: "Fungicides and Their Action," volume II (1945), page 151.
Hellerman et al.: J.A.C.S. 68 (1946), pages 819–821.
Frear: Journal of Economic Entomology, volume 40, No. 5 (1947), pages 736–741, page 740 relied upon.